United States Patent [19]
Dye

[11] 3,832,112
[45] Aug. 27, 1974

[54] APPARATUS FOR MAKING CERAMIC SHINGLES FROM EXTRUDED HOLLOW BLOCKS OF SOFT CLAY

[75] Inventor: Homer S. Dye, Hacienda Heights, Calif.

[73] Assignee: Pacific Clay Products, Los Angeles, Calif.

[22] Filed: Jan. 2, 1973

[21] Appl. No.: 320,153

[52] U.S. Cl.............. 425/291, 425/325, 425/393, 264/58, 264/67
[51] Int. Cl. ........................................... B29c 17/14
[58] Field of Search .......... 425/290, 291, 325, 327, 425/340, 393; 264/56, 58, 67

[56] References Cited
UNITED STATES PATENTS

| | | | |
|---|---|---|---|
| 1,931,617 | 10/1933 | Nelson et al. | 425/290 |
| 1,967,858 | 10/1934 | Ritter | 264/67 X |
| 2,109,028 | 2/1938 | Miller | 264/58 |
| 2,644,217 | 7/1953 | Agar | 264/67 UX |
| 2,795,028 | 6/1957 | Rossier | 264/56 X |
| 3,461,196 | 8/1969 | Bowles | 264/67 UX |
| 3,596,331 | 8/1971 | Gory | 425/290 |

Primary Examiner—R. Spencer Annear
Attorney, Agent, or Firm—Lyon & Lyon

[57] ABSTRACT

Ceramic shingles are produced from hollow blocks of soft clay cut from an extrusion. Each block is die formed at one end to produce an inward directed lip which will form the lower portion of a shingle. The blocks are stacked on parallel side edges while being heated to vitrify the clay, and afterwards portions of each block are discarded to produce two substantially duplicate ceramic shingles. Apparatus for die forming the hollow blocks of soft clay include internal and external dies to form the inward directed lips.

8 Claims, 11 Drawing Figures

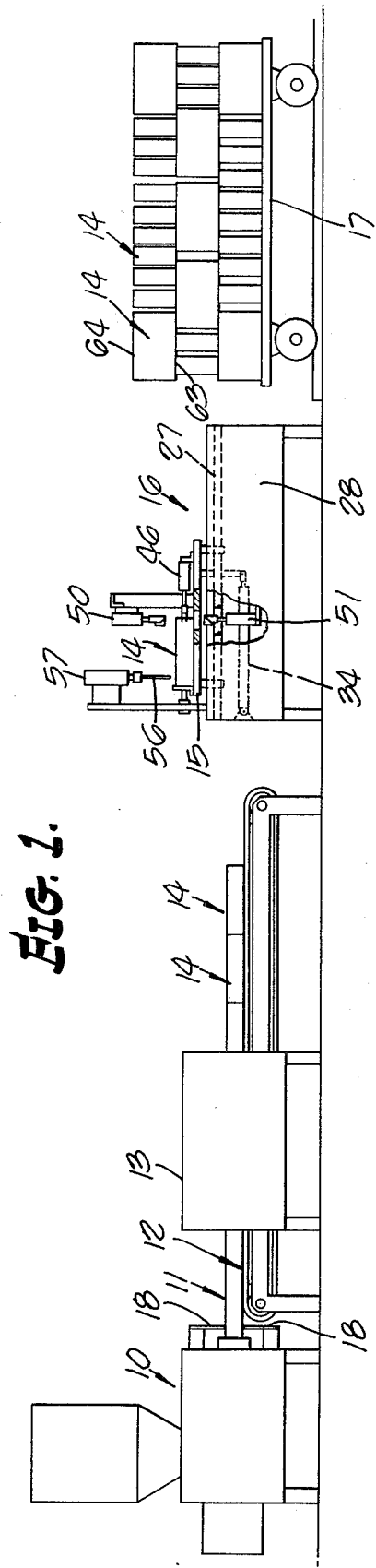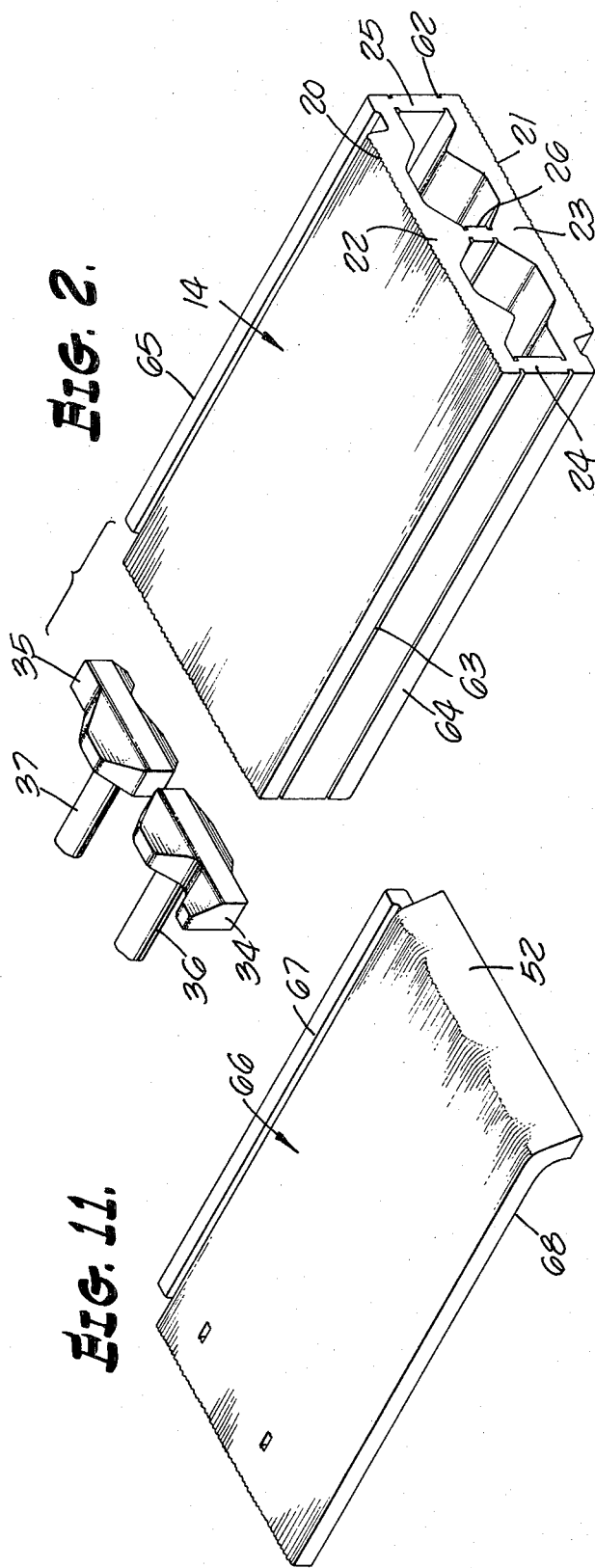

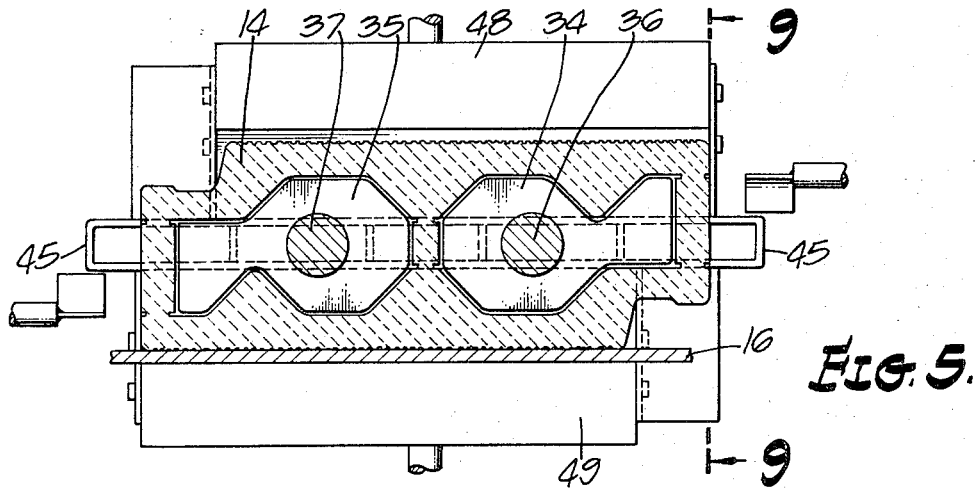
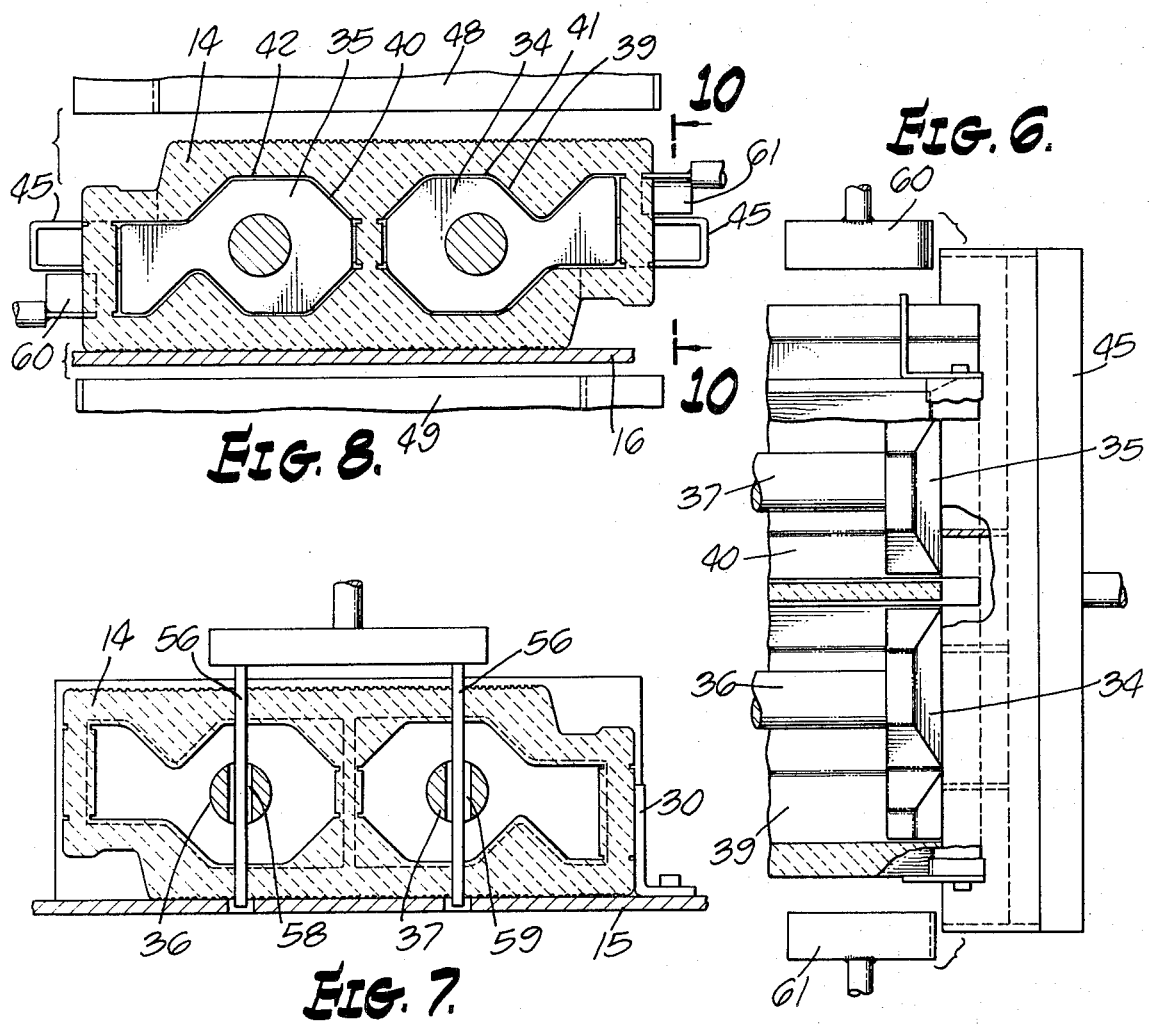

APPARATUS FOR MAKING CERAMIC SHINGLES FROM EXTRUDED HOLLOW BLOCKS OF SOFT CLAY

This invention relates to ceramic shingles and is particularly directed to a method and apparatus for producing such shingles in pairs, so that manufacturing economies can be achieved, particularly during firing in a kiln. Clay shingles have relatively great length and width as compared to their thickness, and before firing do not have enough strength to permit individual stacking. It is an important object of this invention to provide a method and apparatus which enables pairs of shingles to be formed as integral blocks which can be stacked on a kiln car during firing, the blocks being generally rectangular in form and capable of separation after firing to produce two substantially duplicate ceramic shingles. The ability to stack a large number of double shingle blocks on a kiln car and without excessive waste space reduces the per-shingle cost of fuel for firing the kiln to an acceptable value.

The process of this invention includes the steps of extruding a hollow member of soft clay, cutting the hollow member into duplicate hollow blocks of generally rectangular shape, die forming one end of each hollow block to form two inwardly directed terminal lips, each of which lips will later form the lower closed end of a ceramic shingle. The process also includes stacking of the die formed hollow blocks of soft clay while heating the stacks so formed, and subsequently breaking apart each vitrified hollow block to produce two substantially duplicate ceramic shingles.

The apparatus of this invention relates to the provision of internal and external forming dies which engage the soft clay of the hollow block and which shape one end of the block to form two inwardly directed lips. The internal dies are held in stationary position while the hollow block is moved in a direction to telescope over them. When the internal dies are in place, external dies are moved to shape the inward extending lips, and a movable separator tool is placed between the external dies to limit their range of travel. Additional movable parts are employed to form nail holes in the shingle portions of the blocks and to re-establish grooves in the side surfaces which will permit a clean break, after vitrification, to separate the two duplicate shingles from side rails and a center rail forming a part of the original hollow block.

Other and more detailed objects and advantages will appear hereinafter.

In the drawings:

FIG. 1 is a diagrammatic layout showing apparatus used in making ceramic shingles.

FIG. 2 is a perspective view showing the integral double shingle block and internal forming dies.

FIG. 5 is a sectional elevation taken substantially on the lines 5—5 as shown in FIG. 4.

FIG. 6 is a sectional plan view taken substantially on the lines 6—6 as shown in FIG. 4.

FIG. 7 is a sectional elevation taken substantially on the lines 7—7 as shown in FIG. 4.

FIG. 8 is a view similar to FIG. 5 with the parts shown in a different position.

FIG. 11 is a perspective view showing a completed ceramic shingle.

Figure 3:
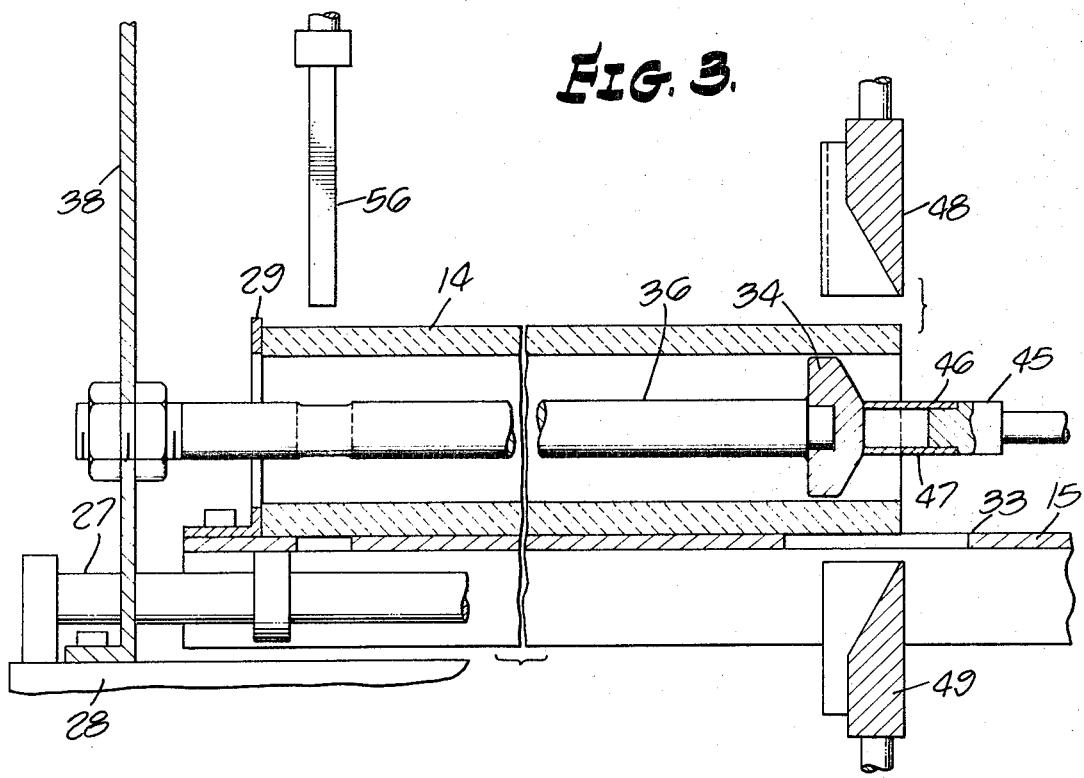
FIG. 3 is a sectional side elevation partly broken away, showing a preferred embodiment of apparatus constructed in accordance with this invention.

The method and apparatus of this invention contemplate the use of extrusion apparatus generally designated 10 for producing a continuous clay extrusion 11 onto an endless conveyor 12. A cutting device 13 of conventional form cuts the continuous extrusion 11 into a series of extrusion blocks in the form of integral double shingles 14.

The double shingle blocks 14 are then transferred one at a time from the conveyor 12 to the table 15 of the forming apparatus generally designated 16. Upon completion of the forming operations, the double shingle blocks are removed from the forming apparatus and stacked on a kiln car 17. They are then passed through a heated kiln, not shown, to produce vitrified blocks.

The cross section shape of the double shingle block 14 as extruded is best shown in FIG. 2. For appearance purposes, the upper surface 20 and the lower surface 21 may contain longitudinal grooves or striations which are produced by stationary wire brushes 18 mounted on the frame of the extrusion apparatus 10 and arranged to contact the upper and lower surfaces of the clay extrusion 11. The double shingle block 14 has a first portion 22 containing the roughened surface 20 and a second portion 23 containing the roughened surface 21. Side rails 24 and 25 and center rail 26 initially connect the first portion 22 and the second portion 23, but after passage through the kiln on the kiln car 17, each vitrified double block 14 is split apart to form two separate ceramic shingles which are substantially duplicates. The side rails 24 and 25 and the center rail 26 are discarded.

One of the completed ceramic shingles 27 is shown in FIG. 11.

The table 15 is mounted for sliding movement on parallel stationary horizontal bars 27 fixed to the frame 28 of the forming apparatus 16. The table 15 is provided with an end stop 29 (FIGS. 3 and 4) and a lateral stop 30 (FIG. 7). A double shingle block 14 is placed on the upper surface 33 of the table 15 when the table is in a retracted position (not shown) near the right-hand end of the forming apparatus 16 shown in FIG. 1. Longitudinal movement of the table 15 in both directions is accomplished by the power cylinder assembly 34. After the double shingle block 14 has been placed on the upper surface 33 of the table 15 and in contact with the end stop 29 and lateral stop 30, the power cylinder assembly 34 is energized to move the table 14 to the left and to the forming position shown in FIG. 1 and 3. The double shingle block 14 moves with the table 15 and telescopes over the stationary internal forming dies 35 and 36 carried at the extending ends of stationary horizontal rods 36 and 37. The rods 36 and 37 are bolted to the stationary plate 38 fixed on the frame 28. The cavities 39 and 40 have the same cross sectional shape as the outline of the dies 34 and 35, respectively, so that a small clearance space 41 exists between the forming die 34 and the cavity 39, and a small clearance space 43 exists between the cavity 40 and the die 35.

The cavities 39 and 40 are produced during the extrusion operation.

Figure 4:
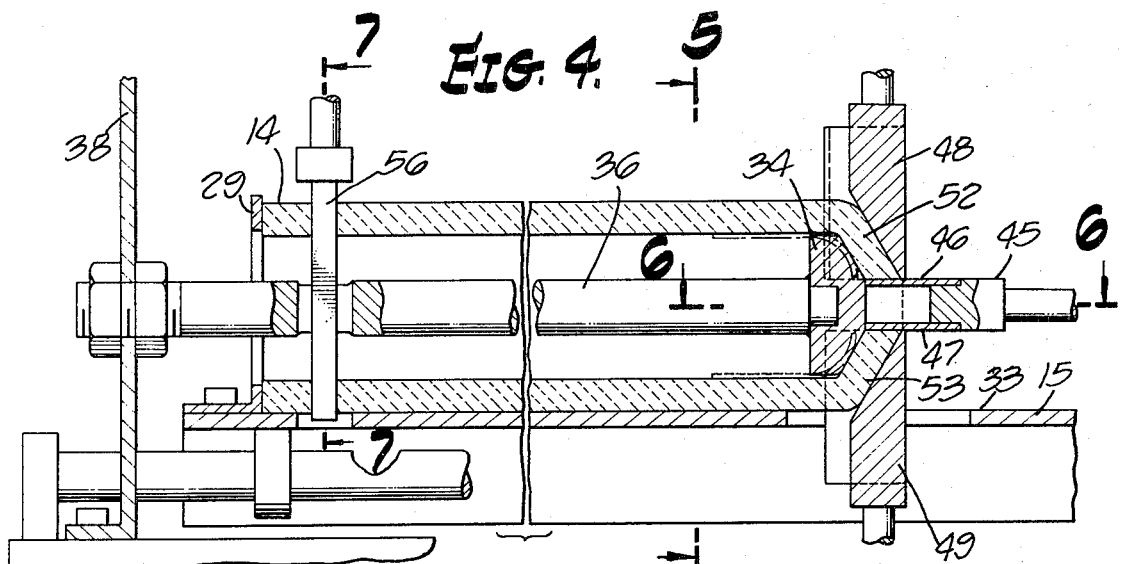
FIG. 4 is a view similar to FIG. 3 with the parts shown in a different position.
Figure 9:
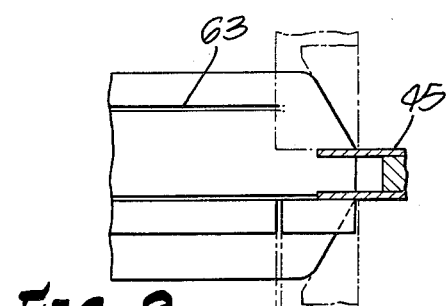
FIG. 9 is a sectional detail taken substantially on the lines 9—9 as shown in FIG. 5.
Figure 10:
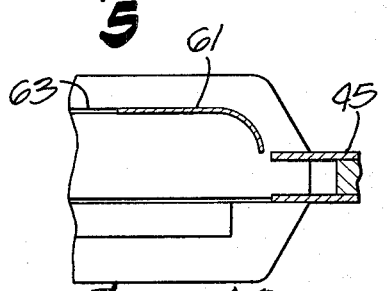
FIG. 10 is a sectional detail taken substantially on the lines 10—10 as shown in FIG. 8.

After the movement of the table 15 has caused the double shingle block 14 to telescope over the internal forming dies 34 and 35 to the position shown in FIG. 3, the separator tool 45 is advanced to the position shown in FIGS. 3 and 4. In this position the tool 45 contacts the forming dies 34 and 35. The tool 45 is moved by means of the power cylinder assembly 46 (FIG. 1) mounted on the table 15. The separator tool 45 is provided with parallel horizontal plates 46 and 47 which enter the soft clay for a short distance, and at a location above and below the integral rails 24, 25 and 26. At this stage of the operation, the parts are in the position shown in FIGS. 1 and 3.

The external die parts 48 and 49 are then moved toward each other and at right angles to the plane of the table surface 33. This is accomplished by means of the power cylinder assemblies 50 and 51 (FIG. 1). Parts 48 and 49 move to the position shown in FIG. 4 and deform the shape of the soft clay over the internal stationary dies 34 and 35 and against the plates 46 and 47 of the separator tool 45. In this way an inward-directed lip 52, 53 is provided on the upper and lower portions of the double shingle block 14.

At about the same time that the external die parts 48 and 49 are brought to the position shown in FIG. 4, the punches 56 are driven downward by the power cylinder assembly 57 carried on the stationary plate 38. Two holes are thus punched in the upper portion and lower portion of the double shingle block 14. Transverse clearance apertures 58 are provided in the stationary rod 36 and 37 to permit passage of the punches 56. The holes in the shingles are used later to accommodate fastenings for securing the vitrified shingles to the roof of a building.

After the external die parts 48 and 49 are retracted away from the double shingle block 14, a pair of curved blades 60 and 61 are moved laterally into the soft clay of the double shingle block for a short distance to form a continuation of the grooves 62 and 63, respectively, in the regions near the lips 52 and 53 where the grooves were obliterated. These grooves form one of the boundaries between the side rails 24, 25 and the first and second portions 22 and 23 of the double shingle block 14. Re-establishment of the ends of the grooves by means of the retractable blades 60 and 61 is necessary to define the inner portions of the shingle parts 22 and 23 in the region of the inward directed lips 52 and 53. The blades 60 and 61 are operated by power cylinder assemblies, not shown.

After the blades 61 and 62, punches 56, external die parts 48 and 49, and separator tool 45 have all been withdrawn to retracted position, the table 15 is returned to its retracted position by means of the power cylinder assembly 34. In the course of this retraction of the table 15 the double shingle block 14 moves away ffrom the internal dies 34 and 35 until the parts reach the position shown in FIG. 2. The double shingle block 14 with its formed end is then transferred from the table 15 and stacked on the kiln car 17. It is to be noted that the soft clay double shingle block 14 after being operated on by the forming apparatus 16 is placed on the kiln car prior to removal of the side rails 24 and 25 and the center rail 26. This enables the blocks 14 to be stacked on either side surface 64 or 65, permitting a maximum number of ceramic shingles to be carried on each kiln car. Stacking of individual soft clay shingles would be impossible.

When the kiln car 17 emerges from the kiln (not shown(, the vitrified material readily breaks along the lines of the grooves which define the side rails 24 and 25 and the center rail 26, and these latter parts are discarded, leaving only a pair of substantially duplicate shingles, each of the type shown at 66 in FIG. 11.

The two shingles produced from each double shingle block 14 are not precise duplicates because the rough score lines on the surface 20 of one shingle are smoothed somewhat on the side which once rested on the table 15 while the double shingle block 14 was formed of soft clay, and prior to vitrification. The practical result is that one shingle of each pair has sharper striation lines than the other shingle, and after being fired in the kiln this difference is preserved. The smoother shingles are intermixed with the rougher shingles on a roof to produce a pleasing pattern, since reflected light from the roof formed of such shingles has a slightly different hue or intensity from a smoother shingle as compared to a rougher shingle.

The completed shingle 66 when installed on a roof has a portion 67 which is overlapped by an adjacent shingle and another portion 68 which overlaps the adjacent shingle on the other side.

Having fully described my invention, it is to be understood that I am not to be limited to the details herein set forth but that my invention is of the full scope of the appended claims.

I claim:

1. Apparatus for making ceramic shingles comprising, in combination: means for producing a hollow block of soft clay having parallel external top and bottom surfaces and parallel external side surfaces, internal die means, means for placing the internal die means within the hollow interior of said block through relative movement of said die means and said block, external die means movable with respect to said block and cooperating with said internal die means to deform and shape one end of the block to form a pair of inwardly directed lips each merging with one of said top and bottom surfaces, respectively, said formed block being shaped for stacking with duplicate blocks on their side surfaces to permit simultaneous firing of the stacked hollow blocks in a kiln.

2. The combination set forth in claim 1 in which a movable table is provided to support the hollow block, and stationary internal dies are received within the hollow interior of the block upon movement of the table.

3. The combination set forth in claim 2 in which external dies move in a direction at right angles to the movement of the table to cooperate with the stationary internal dies to form the inwardly directed lips.

4. Apparatus for making ceramic shingles comprising, in combination: means for producing a hollow block of soft clay having parallel external top and bottom surfaces and parallel external side surfaces, stationary internal die means, means for placing the internal die means within the hollow interior of said block, said means including a movable table for supporting the hollow block, external die means movable with respect to said block and cooperable with said internal die means to deform and shape one end of the block to form a pair of inwardly directed lips each merging with one of said top and bottom surfaces, respectively, said formed block being shaped for stacking with duplicate blocks on their side surfaces to permit simultaneous firing of the stacked hollow blocks in a kiln.

5. In a device for forming a pair of soft unfired clay shingles from an extruded hollow rectangular block of soft clay, the improvement comprising, in combination: a movable table to support the hollow block, stationary internal die means, means for moving the table and hollow block in one direction to place the internal die means within the interior of the hollow block, external die means, means for moving said external die means with respect to said block to cooperate with said internal die means to deform and shape the block to form a pair of inwardly directed lips at one end of the block, and means for moving the table in the other direction to separate the formed block from the internal die means.

6. The combination set forth in claim 5 in which said external die means comprises oppositely moving external dies engaging opposite faces of said hollow block.

7. The combination set forth in claim 5 including a separator tool, and means for moving the separator tool to engage said internal die means to cooperate with the internal and external die menas in forming siad lips.

8. The combination set forth in claim 5 including curved blade members, and means for moving said blade members laterally into engagement with said hollow block after forming of the lips in order to define the side edges of the lips.

* * * * *